US010337371B2

(12) United States Patent
Zamani et al.

(10) Patent No.: US 10,337,371 B2
(45) Date of Patent: Jul. 2, 2019

(54) METHOD AND A SYSTEM FOR EVALUATING AN EFFECTIVE COMPONENT CONTENT OF A REDUCING AGENT

(71) Applicant: SCANIA CV AB, Södertälje (SE)

(72) Inventors: Sebastian Zamani, Stockholm (SE); Joakim Sommansson, Grödinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 15/579,995

(22) PCT Filed: Apr. 12, 2016

(86) PCT No.: PCT/SE2016/050314
§ 371 (c)(1),
(2) Date: Dec. 6, 2017

(87) PCT Pub. No.: WO2016/200308
PCT Pub. Date: Dec. 15, 2016

(65) Prior Publication Data

US 2018/0171843 A1 Jun. 21, 2018

(30) Foreign Application Priority Data

Jun. 9, 2015 (SE) ...................................... 1550755

(51) Int. Cl.
*F01N 11/00* (2006.01)
*F01N 3/02* (2006.01)
(Continued)

(52) U.S. Cl.
CPC ............. *F01N 3/02* (2013.01); *F01N 3/2066* (2013.01); *F01N 11/00* (2013.01); *F17C 13/02* (2013.01);
(Continued)

(58) Field of Classification Search
CPC ......... F01N 2610/10; F01N 2610/1406; F01N 2610/1486; F01N 2900/0422;
(Continued)

(56) References Cited

U.S. PATENT DOCUMENTS

2008/0173074 A1 7/2008 Sasanuma et al. .......... 73/53.01
2010/0086446 A1 4/2010 Matsunaga et al. .......... 422/106
(Continued)

FOREIGN PATENT DOCUMENTS

DE 10 2008 043 778 A1 5/2010
DE 10 2008 044 335 A1 6/2010
(Continued)

OTHER PUBLICATIONS

Office Action and Search Report dated Oct. 8, 2018 issued in corresponding Russian Patent Application No. 2017146236/28(079028) with English translation.
(Continued)

*Primary Examiner* — Jonathan R Matthias
(74) *Attorney, Agent, or Firm* — Ostrolenk Faber LLP

(57) ABSTRACT

A method for evaluating an effective component content (C) of a reducing agent for engine exhaust gas processing arranged in a container (205) in which a heat transfer provision arrangement (240) is provided, including steps of: determining (s410; s420) a prevailing volume (V) and temperature (T1) of the reducing agent in the container (205); determining (s430) a prevailing temperature (T2) of the heat transfer provision arrangement (240); determining (s440) a prevailing temperature (T3) of a medium surrounding the container (205); for a predetermined time period, determining (s450) a mean temperature change rate (Tprim) for the reducing agent; and determining (s460) the effective component content (C) of the reducing agent on the basis of the above determined parameters.

17 Claims, 6 Drawing Sheets

S2
242
S4
271
271
290
240
241
L242
S1
205
L241
243
S3
200
L243
L290

(51) Int. Cl.

| | |
|---|---|
| ***F17C 13/02*** | (2006.01) |
| ***G01F 22/00*** | (2006.01) |
| ***G01F 23/22*** | (2006.01) |
| ***G01F 23/44*** | (2006.01) |
| ***F01N 3/20*** | (2006.01) |
| *G01F 23/296* | (2006.01) |

(52) U.S. Cl.
CPC .............. *G01F 22/00* (2013.01); *G01F 23/22* (2013.01); *G01F 23/44* (2013.01); *F01N 2550/05* (2013.01); *F01N 2610/02* (2013.01); *F01N 2610/10* (2013.01); *F01N 2900/1811* (2013.01); *F01N 2900/1814* (2013.01); *F01N 2900/1818* (2013.01); *G01F 23/296* (2013.01)

(58) Field of Classification Search
CPC ..... F01N 2900/1811; F01N 2900/1814; F01N 2900/1818
See application file for complete search history.

(56) References Cited

U.S. PATENT DOCUMENTS

| | | | | |
|---|---|---|---|---|
| 2012/0031084 | A1 | 2/2012 | Perrin ............................ | 60/299 |
| 2013/0160433 | A1 | 6/2013 | Schepers et al. ............... | 60/295 |

FOREIGN PATENT DOCUMENTS

| | | | |
|---|---|---|---|
| DE | 10 2010 062 302 | A1 | 6/2012 |
| WO | WO 02/27280 | A2 | 4/2002 |
| WO | WO 2012/144949 | A1 | 10/2012 |

OTHER PUBLICATIONS

International Search Report dated Jul. 14, 2016 in corresponding PCT International Application No. PCT/SE2016/050314.

Written Opinion dated Jul. 14, 2016 in corresponding PCT International Application No. PCT/SE2016/050314.

METHOD AND A SYSTEM FOR EVALUATING AN EFFECTIVE COMPONENT CONTENT OF A REDUCING AGENT

CROSS-REFERENCE TO RELATED APPLICATIONS

The present application is a 35 U.S.C. §§ 371 national phase conversion of PCT/SE2016/050314, filed Apr. 12, 2016, which claims priority of Swedish Application No. 1550755-1, filed Jun. 9, 2015, the contents of which are incorporated by reference herein. The PCT International Application was published in the English language.

TECHNICAL FIELD

The present invention relates to a method for evaluating an effective component content of a reducing agent. More particularly, the invention relates to a method for evaluating an effective component content of a reducing agent in a container of an SCR-system. The invention relates also to a computer program product comprising program code for a computer for implementing a method according to the invention. It relates also to a system for evaluating an effective component content of a reducing agent and a motor vehicle equipped with the system. More particularly, the invention relates to a system for evaluating an effective component content of a reducing agent in a container of an SCR-system.

BACKGROUND

Vehicles today use, for example, urea as reducing agent in SCR (selective catalytic reduction) systems which comprise an SCR catalyst in which said reducing agent and $NO_x$ gas can react and be converted to nitrogen gas and water. Various types of reducing agents may be used in SCR systems. AdBlue is an example of a commonly used reducing agent.

One type of SCR system comprises a container which holds a reducing agent. The system has also a pump adapted to drawing said reducing agent from the container via a suction hose and supplying it via a pressure hose to a dosing unit situated adjacent to an exhaust system of the vehicle. The dosing unit is adapted to injecting a necessary amount of reducing agent into the exhaust pipe upstream of the SCR catalyst according to operating routines which are stored in a control unit of the vehicle. To make it easier to regulate the pressure when there are small or no dosing amounts, the system comprises also a return hose which runs back to the container from a pressure side of the system.

It is of utmost importance that the reducing agent comprises a desired and expected content of an effective component, such as urea. In another case, a supply of said reducing agent will be inappropriate leading to inadequate emission control. Today there is a risk of mistakenly providing other liquids to said container for said reducing agent. Also, even intended provision of an undesired liquid to said container may be performed in case of tampering. There is also a risk that a provided reducing agent simply does not meet the specification of its content, which will render an unwanted concentration of said effective component.

US20080173074 relates to a method for measuring a prevailing concentration of urea in a container based upon determined values of resistance.

SUMMARY OF THE INVENTION

An object of the present invention is to propose a novel and advantageous method for evaluating an effective component content of a reducing agent.

Another object of the invention is to propose a novel and advantageous system and a novel and advantageous computer program for evaluating an effective component content of a reducing agent.

An object of the present invention is to propose a novel and advantageous method for evaluating an effective component content of a reducing agent held in a container of an SCR-system.

Another object of the invention is to propose a novel and advantageous system and a novel and advantageous computer program for evaluating an effective component content of a reducing agent held in a container of an SCR-system.

Yet another object of the invention is to propose a method, a system and a computer program which achieve an efficient and accurate evaluation of an effective component content of a reducing agent.

Yet another object of the invention is to propose a method, a system and a computer program for achieving a robust, reliable and cost-effective evaluation of an effective component content of a reducing agent in a container of an SCR-system.

Yet another object of the invention is to propose an alternative method, an alternative system and an alternative computer program for evaluating an effective component content of a reducing agent held in a container.

Yet another object of the invention is to propose an alternative method, an alternative system and an alternative computer program for evaluating an effective component content of a reducing agent held in a container of an SCR-system.

According to an aspect of the invention there is provided a method for evaluating an effective component content of a reducing agent for engine exhaust gas processing arranged in a container in which a heat transfer provision arrangement is provided, comprising the steps of:

- determining a prevailing volume of said reducing agent in said container;
- determining a prevailing temperature of said reducing agent;
- determining a prevailing temperature of said heat transfer provision arrangement;
- determining a prevailing temperature of a medium surrounding said container;
- for a predetermined time period, determining a mean temperature change rate for said reducing agent; and
- determining said effective component content of said reducing agent on the basis of said mean temperature change rate, said prevailing volume of said reducing agent, said prevailing temperature of said reducing agent, said prevailing temperature of said heat transfer provision arrangement and said prevailing temperature of said medium surrounding said container.

Hereby a reliable, accurate and robust method for determining said effective component content of said reducing agent in said container is achieved. Hereby a method for determining said effective component content of said reducing agent in said container considering heat transfer from said heat transfer provision arrangement via said reducing agent and container to a surrounding medium of the container is advantageously achieved. Hereby a method for determining said effective component content of said reducing agent in said container considering heat transfer from said surrounding medium of the container via said container and reducing agent to said heat transfer provision arrangement is advantageously achieved. Hereby a versatile method is achieved.

The method may comprise the step of:

determining a specified development of a connection between said effective component content and said mean temperature change rate as a basis for said determination of said effective component content for said prevailing volume of said reducing agent, said prevailing temperature of said reducing agent, said prevailing temperature of said heat transfer provision arrangement and said prevailing temperature of said medium surrounding said container. Said specified development of a connection between said effective component content and said mean temperature change rate may be a predetermined development. Hereby a reliable, accurate and robust method for determining a prevailing effective component content of said reducing agent in said container is achieved.

At performance of the method said mean temperature change rate for said reducing agent may be a continuous temperature increase or a continuous temperature decrease. Hereby a versatile method for determining a method for determining said effective component content of said reducing agent is achieved.

The method may comprise the step of:

providing a flow of a liquid of a substantially constant temperature in a pipe arrangement of said heat transfer provision arrangement during said predetermined time period. This provides for an effective heat transfer between said heat transfer provision arrangement and said reducing agent, which advantageously provides a possibility to determine said effective component content within a relatively short period of time.

The method may comprise the steps of:

determining said effective component content of said reducing agent on the basis of said mean temperature change rate on least two occasions, providing mutually different prevailing temperatures of said reducing agent; and comparing the thus determined effective component content relative to the at least two occasions as a sign of an undesired effective component content in said reducing agent. Hereby it may be determined if said reducing agent presents a content having an undesired quality, e.g. that the effective component of said reducing agent has a concentration which is higher or lower than an expected concentration.

The method may comprise the steps of:

determining said effective component content of said reducing agent on the basis of said mean temperature change rate on least two occasions, providing mutually different prevailing temperatures of said reducing agent;

comparing the thus determined effective component content relate to the at least two occasions as a sign of an undesired liquid in said reducing agent. Said undesired liquid may comprise salt water, liquid fuel, such as e.g. diesel, or washer fluid.

By performing said determination of said effective component content of said reducing agent at two different prevailing temperatures of said reducing agent it may in a reliable way be confirmed that said determination of said effective component content is valid. This is because the specific heat capacity of water of said reducing agent does not vary depending on temperature. According to this embodiment, use of a specific heat capacity of said effective component content does vary depending on temperature. Hereby a possibility of diagnosing procedures is provided.

The method may comprise the step of:

provided that said determined effective component content of said reducing agent is unexpected, providing this information for limiting a maximum available engine power and/or for an alarm activity. Hereby is advantageously provided a method whereby an operator may be informed that said reducing agent may not be an appropriate reducing agent. Alternatively, an automatic measure may be taken for adapted propulsion of a vehicle being provided with said reducing agent for emission control purposes.

According to an aspect of the invention, there is provided a system for evaluating an effective component content of a reducing agent for engine exhaust gas processing arranged in a container in which a heat transfer provision arrangement is provided, comprising:

means for determining a prevailing volume of said reducing agent in said container means for determining a prevailing temperature of said reducing agent;

means for determining a prevailing temperature of said heat transfer provision arrangement;

means for determining a prevailing temperature of a medium surrounding said container;

means for determining a mean temperature change rate for said reducing agent regarding a predetermined time period; and means for determining said effective component content of said reducing agent on the basis of said mean temperature change rate, said prevailing volume of said reducing agent, said prevailing temperature of said reducing agent, said prevailing temperature of said heat transfer provision arrangement and said prevailing temperature of said medium surrounding said container.

The system may comprise:

means for determining a specified development of a connection between said effective component content and said mean temperature change rate as a basis for said determination of said effective component content for said prevailing volume of said reducing agent, said prevailing temperature of said reducing agent, said prevailing temperature of said heat transfer provision arrangement and said prevailing temperature of said medium surrounding said container. Said specified development may be a predetermined development.

At the system, said mean temperature change rate for said reducing agent may be a continuous temperature increase or a continuous temperature decrease.

The system may comprise:

means for providing a flow of a liquid of a substantially constant temperature in a pipe arrangement of said heat transfer provision arrangement during said predetermined time period.

The system may comprise:

means for determining said effective component content of said reducing agent on the basis of said mean temperature change rate on least two occasions providing mutually different prevailing temperatures of said reducing agent;

means for comparing the thus determined effective component content related to the at least two occasions as a sign of an undesired effective component content in said reducing agent.

The system may comprise:

means for determining said effective component content of said reducing agent on the basis of said mean temperature change rate on least two occasions providing mutually different prevailing temperatures of said reducing agent;

means for comparing the thus determined effective component content related to the at least two occasions as a sign of an undesired liquid in said reducing agent.

The system may comprise:

provided that said determined effective component content of said reducing agent is unexpected, means for providing this information for limiting a maximum available engine power and/or for an alarm activity.

According to an aspect of the invention, a vehicle is provided comprising a system according to what is presented herein. Said vehicle may be a motor vehicle. Said vehicle may be any vehicle from among a truck, bus or passenger car. According to an embodiment, the system is provided for a marine application or industrial application.

According to an aspect of the invention, a computer program is provided for evaluating an effective component content of a reducing agent, wherein said computer program comprises program code for causing an electronic control unit or a computer connected to said electronic control unit to perform the steps according to one of the methods disclosed herein, when the steps of the method are run on said electronic control unit or said computer.

According to an aspect of the invention, a computer program is provided for evaluating an effective component content of a reducing agent, wherein said computer program comprises program code stored on a computer-readable medium for causing an electronic control unit or a computer connected to said electronic control unit to perform the steps according to the method disclosed herein.

According to an aspect of the invention there is provided a computer program for evaluating an effective component content of a reducing agent, wherein said computer program comprises program code stored on a computer-readable medium for causing an electronic control unit or a computer connected to said electronic control unit to perform the steps according to the invention, when the steps of the method are run on said electronic control unit or said computer.

According to an aspect of the invention there is provided a computer program product containing a program code stored on a computer-readable medium for performing method steps according to the method disclosed herein, when said computer program is run on an electronic control unit or a computer connected to said electronic control unit.

According to an aspect of the invention, a computer program product is provided containing a program code stored on a non-volatile computer-readable medium for performing method steps according to the method disclosed herein, when said computer program is run on an electronic control unit or a computer connected to said electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION OF THE DRAWINGS

Figure 1:
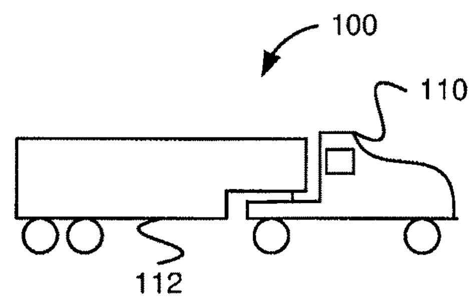
FIG. 1 schematically illustrates a vehicle according to an embodiment of the invention.

FIG. 1 depicts a side view of a vehicle 100 which is an example of a vehicle that may use the invention. The exemplified vehicle 100 comprises a tractor unit 110 and a trailer 112. The vehicle may be a heavy vehicle, e.g. a truck. The vehicle may also be a bus. It may alternatively be a car.

The invention is suitable for application in various systems comprising a container holding a reducing agent for various purposes. The invention is also suitable for application in any SCR system and is therefore not confined to SCR systems of motor vehicles.

The innovative method and the innovative system in one aspect of the invention are well suited to other platforms which comprise an SCR system than motor vehicles, e.g. watercraft. The watercraft may be of any kind, e.g. motor boats, steamers, ferries or ships.

The innovative method and the innovative system according to one aspect of the invention are also well suited to, for example, systems which comprise industrial engines and/or engine-powered industrial robots; to various kinds of power plants, e.g. an electric power plant which comprises an engine-powered generator; to any engine system which comprises an engine and an SCR system, e.g. on a locomotive or some other platform; and to any system which comprises a $NO_x$ generator and an SCR-system.

The term “link” refers herein to a communication link which may be a physical connection such as an opto-electronic communication line, or a non-physical connection such as a wireless connection, e.g. a radio link or microwave link.

The term “line” refers herein to a passage for holding and conveying a fluid, e.g. a reductant in liquid form. The line may be a pipe of any desired size and be made of any suitable material, e.g. plastic, rubber or metal.

The term “reductant” or “reducing agent” refers herein to an agent used for reacting with certain emissions in an SCR system. These emissions may for example comprise $NO_x$ gas. The terms “reductant” and “reducing agent” are herein used synonymously. In one version, said reductant is named AdBlue. An effective component of said reducing agent may comprise Urea. Said effective component content of the reducing agent may be e.g. 32%. This is a desired and expected concentration of said effective component in some applications. The inventive method and inventive system make it possible to determine said effective component content and to compare it with a desired/expected value of said effective component content. Other kinds of reductants may of course be used. AdBlue is herein cited as an example of a reductant, but one skilled in the art will appreciate that the innovative method and the innovative SCR system are feasible with other types of reductants, subject to necessary adaptations in control algorithms for executing program code in accordance with the innovative method.

Figure 2A:
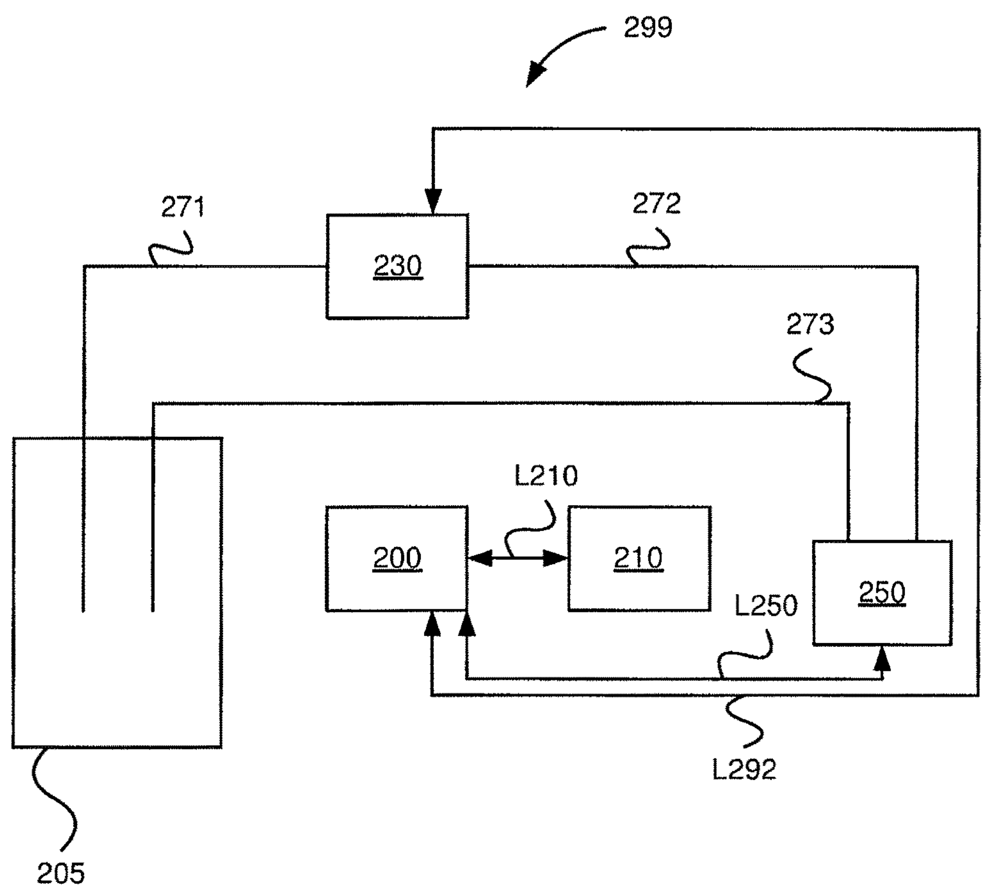
FIG. 2A schematically illustrates a subsystem for the vehicle depicted in FIG. 1, according to an embodiment of the invention.

FIG. 2A depicts a subsystem 299 of the vehicle 100. The subsystem 299 is usually situated in the tractor unit 110 where there is one. The subsystem may be part of an SCR system. It comprises in this example a container 205 configured to hold a reductant. The container 205 is configured to contain a suitable amount of reductant and also to being replenishable with reductant as necessary. The container 205 is depicted in greater detail with reference to FIG. 2C.

A first line 271 is configured to lead the reductant to a pump 230 from the container 205. The pump 230 may be any suitable pump. It may be configured to being driven by an electric motor. It is adapted to drawing the reductant from the container 205 via the first line 271 and supplying it via a second line 272 to a dosing unit 250. The dosing unit 250 may comprise an electrically operated dosing valve by means of which a flow of reductant added to the exhaust system can be controlled. The pump 230 is configured to pressurize the reductant in the second line 272. Said dosing unit 250 is provided with a throttle unit against which said pressure of the reductant is built up in the subsystem 299.

The dosing unit 250 is configured to supply said reducing agent to an exhaust gas system (see FIG. 2B) of the vehicle 100. In particular the dosing unit 250 is configured to in a controlled way supply a suitable amount of reducing agent to an exhaust gas system of the vehicle 100. An SCR-unit 260 (see FIG. 2B) is arranged downstream of a position of the exhaust gas system where injection of reducing agent is achieved by means of the dosing unit 250.

In FIG. 2A, a third line 273 runs between the dosing unit 250 and the container 205. The third line 273 is arranged to lead back to the container 205 a certain amount of reducing agent which had been fed to the dosing unit 250. This configuration advantageously cools the dosing unit 250, whereby the dosing unit 250 is cooled by a flow of the reducing agent being fed through the dosing unit 250 from the pump 230 to the container 205.

The first control unit 200 is arranged for communication with the pump 230 via a link L292 and the first control unit is configured to control the operation of the pump 230 in order for example to regulate flows of reductant within the subsystem 299. The first control unit 200 is configured to control an operating power of the pump 230 by regulating the electric motor associated with said pump 230.

The first control unit 200 is arranged for communication with the dosing unit 250 via a link L250 and is configured to control the operation of the dosing unit 250 in order, for example, to regulate the supply of reductant to the exhaust gas system of the vehicle 100. The first control unit 200 is configured to control the operation of the dosing unit 250 in order for example to regulate the supply of reductant back to the container 205.

A second control unit 210 is configured for communication with the first control unit 200 via a link L210 and may be detachably connected to it. The second control unit 210 may be external to the vehicle 100. It may be configured to conduct the innovative method steps according to the invention. The second control unit 210 may be arranged to perform the inventive method steps according to the invention. It may be used to cross-load software to the first control unit 200, particularly software for conducting the innovative method. It may alternatively be arranged for communication with the first control unit 200 via an internal network on board the vehicle. It may be configured to performing substantially the same functions as the first control unit 200, such as determining said effective component content of said reducing agent on the basis of a mean temperature change rate relating to a reducing agent of said container, a prevailing volume of said reducing agent, a prevailing temperature of said reducing agent, a prevailing temperature of said heat transfer provision arrangement and a prevailing temperature of said medium surrounding said container. This is depicted in greater detail below. The innovative method may be conducted by the first control unit 200 or the second control unit 210, or by both of them.

Figure 2B:
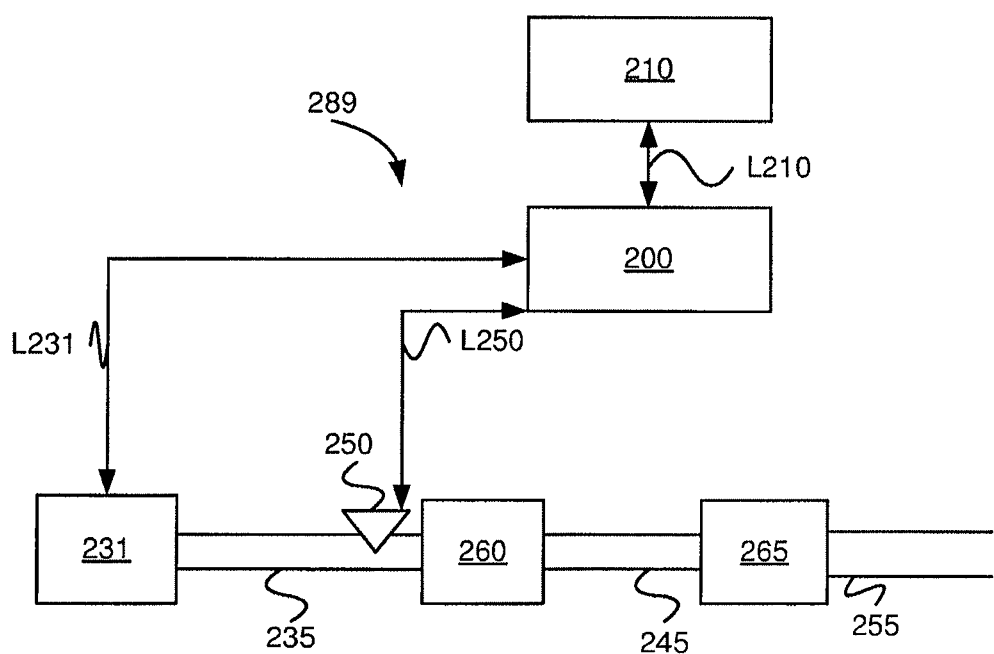
FIG. 2B schematically illustrates a subsystem for the vehicle depicted in FIG. 1, according to an embodiment of the invention.

FIG. 2B schematically illustrates a portion of an SCR-system 289 for use in the vehicle 100 shown in FIG. 1.

During its operation, an engine 231 is generating an exhaust gas flow which is led via a first passage 235 to an SCR-unit 260. Said engine 231 may be a combustion engine. A second passage 255 is arranged to lead exhaust gas from said SCR-unit 260 to an ammonia slip catalyst 265. A third passage 245 is arranged to lead exhaust gas from said ammonia slip catalyst 265 to a surrounding of said SCR-system 289/vehicle 100

Said SCR-system 289 may also comprise a DPF-unit (Diesel Particulate Filter) and/or a DOC-unit (Diesel Oxidation Unit). These units may be arranged at the first passage 235.

The first control unit 200 is arranged for communication with said engine 231 via a link L231. The first control unit 200 is arranged to control operation of the engine 231 according to stored operational routines. The first control unit 200 is arranged to control operation of the dosing unit 250 for injecting reducing agent into the first passage 235.

Figure 2C:
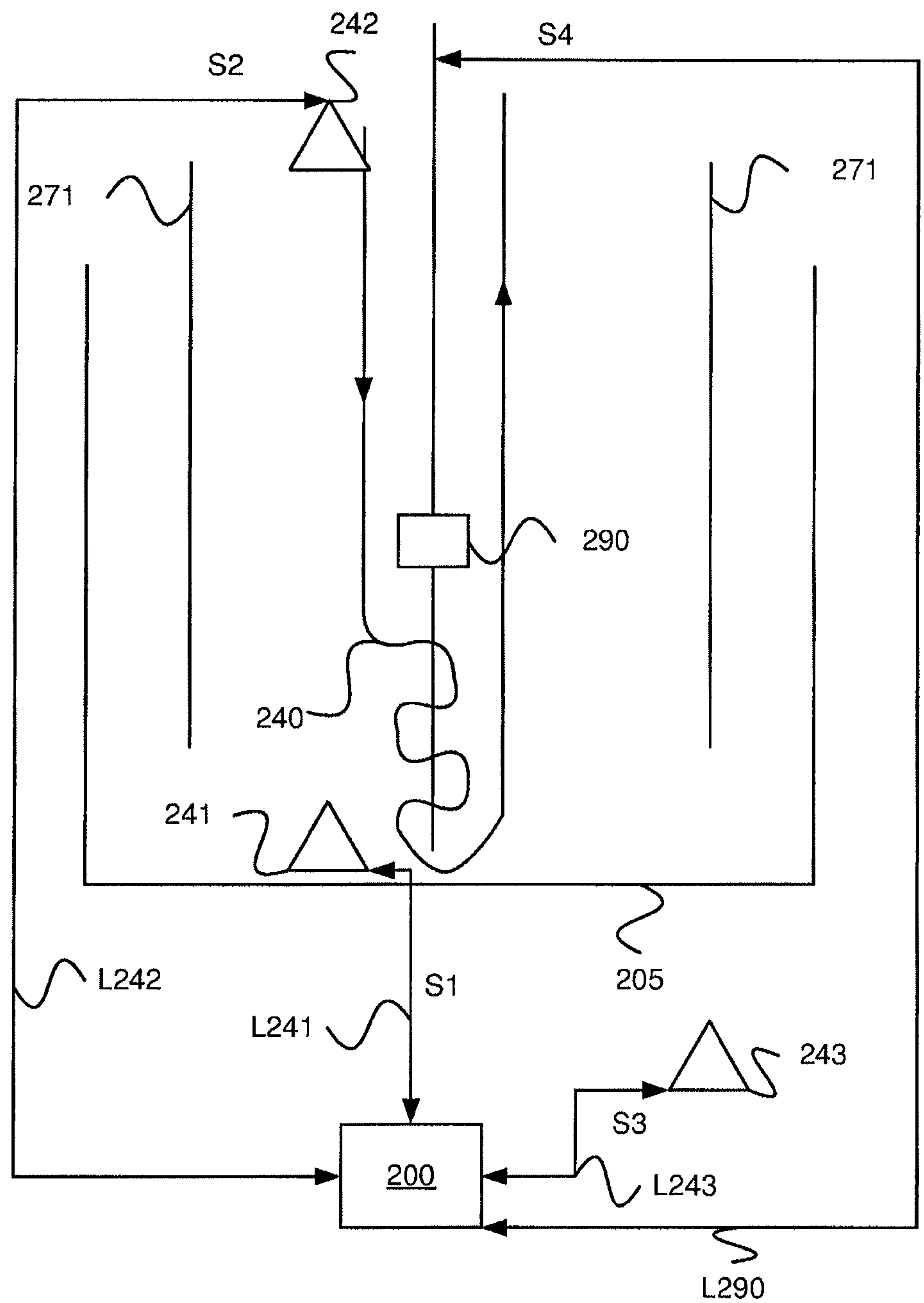
FIG. 2C schematically illustrates a container being provided with a heat transfer provision arrangement.

FIG. 2C schematically illustrates the container 205 in greater detail. Said container 205 is arranged to hold a said reducing agent. Said first line 271 is arranged to convey said reducing agent to said pump 230. Said third line 273 is arranged to convey said reducing agent back to said container 205 from said dosing unit 250.

Said container 205 is provided with a volume measuring device 290. Said volume measuring device comprises a floater based measuring unit arranged on a rigid elongated member for slideably holding said floating measuring unit. Said rigid elongated member comprises electronics for detecting a prevailing position, corresponding to a prevailing volume V of said reducing agent, as the floating measuring device is floating on a surface of said reducing agent. Signals S4 comprised of said volume information are transmitted to said first control unit 200 via a link L290. Alternatively, an ultrasonic based measuring unit is provided in said container for determining said prevailing volume of said liquid.

A heat transfer provision arrangement 240 is arranged in said container 205. Said heat transfer provision arrangement 240 comprises a line, also referred to as pipe arrangement, for conveying a fluid for heat transfer to/from said reducing agent in said container. According to this example, said fluid flows in said line in a closed circuit from said engine 231 via said heat transfer provision arrangement 240 and back to said engine 231. Said heat transfer provision arrangement 240 may advantageously at least partly present a helical form surrounding said rigid elongated member so as to more efficiently allow said heat transfer to/from said reducing agent. Said reducing agent may be cooling water from said engine 231. According to one embodiment said cooling water is heated from cooling said engine 231 and thus presents a relatively high temperature, or at least a higher temperature than said liquid. Said reducing agent is thereby heated by said heat transfer provision arrangement 240.

A first temperature sensor 241 is arranged to measure a prevailing temperature T1 of said reducing agent. Said first temperature sensor 241 is arranged for communication with said first control unit 200 via a link L241. Said first temperature sensor 241 is arranged to continuously or intermittently send signals S1 comprising information about said prevailing temperature T1 of said reducing agent to said first control unit 200 via said link L241. Said first temperature sensor 241 may be arranged at the bottom of said container 205.

A second temperature sensor 242 is arranged to measure a prevailing temperature Tf of said fluid in said heat transfer provision arrangement 240. Said second temperature sensor 242 is arranged for communication with said first control unit 200 via a link L242. Said second temperature sensor 242 is arranged to continuously or intermittently send signals S2 comprising information about said prevailing temperature Tf of said fluid of said heat transfer provision arrangement 240 to said first control unit 200 via said link L242. Said second temperature sensor 242 may be arranged at an inlet side of said heat transfer provision arrangement 240 at the container 205. According to an example, said prevailing temperature Tf of said fluid in said heat transfer provision arrangement 240 is used by said first control unit 200 to determine a prevailing temperature T2 of said heat transfer provision arrangement 240. This may be performed by means of a model stored in a memory of said first control unit 200. According to one example, it is assumed that said heat transfer provision arrangement 240 has substantially the same temperature as said fluid. According to this example said prevailing temperature Tf of said fluid is set to be said second temperature T2 of said heat transfer provision arrangement 240.

A third temperature sensor 243 is arranged to measure a prevailing temperature T3 of a surrounding medium of said container 205. Said third temperature sensor 243 is arranged for communication with said first control unit 200 via a link L243. Said third temperature sensor 243 is arranged to continuously or intermittently send signals S3 comprising information about said prevailing temperature T3 of said surrounding medium to said first control unit 241 via said link L243. Said third temperature sensor 243 may be arranged in close proximity to said container 205.

Said first control unit 200 is thereby arranged, for a predetermined time period to, determine a mean temperature change rate Tprim for said reducing agent. This may be a mean time derivative of said first temperature T1 regarding said predetermined time period of heat transfer between said heat transfer provision arrangement 240 and said reducing agent.

Said first control unit 200 is thereby arranged to determine said effective component content of said reducing agent on the basis of said mean temperature change rate Tprim, said prevailing volume V of said reducing agent, said prevailing temperature T1 of said reducing agent, said prevailing temperature T2 of said heat transfer provision arrangement and said prevailing temperature T3 of said medium surrounding said container 205. This is depicted in greater detail with reference to FIG. 3.

The first control unit 200 is arranged to determine a specified development of a connection between said effective component content C and said mean temperature change rate Tprim as a basis for said determination of said effective component content C for said prevailing volume V of said reducing agent, said prevailing temperature T1 of said reducing agent, said prevailing temperature T2 of said heat transfer provision arrangement and said prevailing temperature T3 of said medium surrounding said container 205.

It should be noted that said mean temperature change rate Tprim for said reducing agent may be a continuous temperature increase or a continuous temperature decrease. The inventive method may thus be used during heat transfer from said reducing agent to said heat transfer provision arrangement 240 (and thus said fluid in said pipe arrangement).

Figure 3:
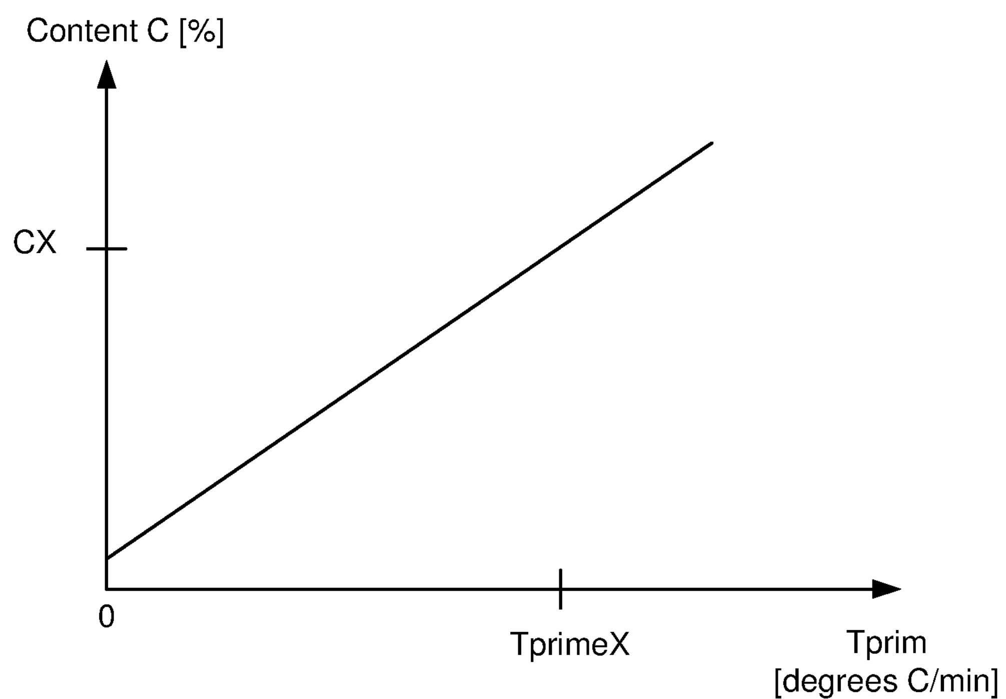
FIG. 3 is a schematic diagram presenting a reducing agent content as a function of temperature change rate, according to an embodiment of the invention.

FIG. 3 schematically illustrates a diagram wherein an effective component content C of a reducing agent is presented as a function of said temperature change rate Tprim. Said effective component content C is given in percent (%). Said temperature change rate Tprim is given in degrees Celsius/minute. Said temperature change rate Tprim may be a mean temperature change rate Tprim regarding a temperature T1 of said reducing agent in said container 205. Said mean temperature change rate Tprim may be determined as a mean value of the time derivative regarding said reducing agent temperature T1 relating to predetermined time period, such as 600 seconds, during heating of said reducing agent in said container 205.

The diagram presented in FIG. 3 is related to a specific prevailing volume V of said reducing agent, a specific prevailing temperature T1 of said reducing agent, a specific prevailing temperature T2 of said heat transfer provision arrangement 240 and a specific prevailing temperature T3 of said medium surrounding said container 205. The first control unit 200 is thereby arranged to select a specific graph relating to said four prevailing parameter values and also determine an effective component content C of said reducing agent in said container 205 on the basis of said determined temperature change rate Tprim.

The graph representing said effective component content C of said reducing agent as a function of said temperature change rate Tprim is hereby predetermined. The graph representing said volume V as a function of said temperature change rate Tprim may alternatively be in a form of a so called map, which is stored in a memory of said first control unit 200.

A number of such diagrams are stored in a memory of the first control unit 200. Each diagram refers to a determined combination of a specific prevailing volume V of said reducing agent, a specific prevailing temperature T1 of said reducing agent, a specific prevailing temperature T2 of said heat transfer provision arrangement 240 and a specific prevailing temperature T3 of said medium surrounding said container 205. According to an embodiment, more than 100 such diagrams may be used according to the invention.

In this case a prevailing volume of said reducing agent is determined to be 50 liters, a prevailing temperature T1 of said reducing agent is determined to be 15 degrees Celsius, a prevailing temperature T2 of said heat transfer provision arrangement is determined to be 90 degrees Celsius, said prevailing temperature of said medium surrounding said container is determined to be 10 degrees Celsius. For this set of parameter values, the unique graph illustrated with reference to FIG. 3 is determined.

During heating of said reducing agent by means of a heat transfer provision arrangement 240 a prevailing temperature T1 of said reducing agent is measured. Regarding a specific period of time, a mean temperature change rate Tprim is determined. In this case, a mean temperature change rate TprimX is determined. A corresponding effective component content CX of said reducing agent may be determined by use of said diagram.

Figure 4A:
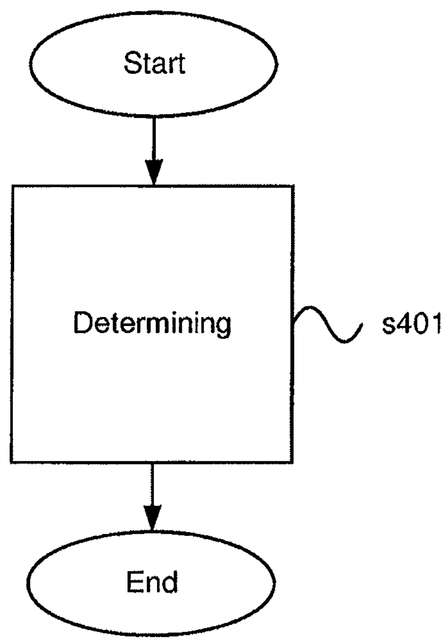
FIG. 4A is a schematic flowchart of a method according to an embodiment of the invention.

FIG. 4A schematically illustrates a flow chart of a method for evaluating an effective component content C of a reducing agent for engine exhaust gas processing arranged in a container 205 in which a heat transfer provision arrangement 240 is provided. The method comprises the method step s401. The method step s401 comprises the steps of:

- determining a prevailing volume V of said reducing agent in said container 205;
- determining a prevailing temperature T1 of said reducing agent;
- determining a prevailing temperature T2 of said heat transfer provision arrangement;
- determining a prevailing temperature T3 of a medium surrounding said container;
- for a predetermined time period, determining a mean temperature change rate Tprim for said reducing agent; and
- determining said effective component content C of said reducing agent on the basis of said mean temperature change rate Tprim, said prevailing volume V of said reducing agent, said prevailing temperature T1 of said reducing agent, said prevailing temperature T2 of said heat transfer provision arrangement 240 and said prevailing temperature T3 of said medium surrounding said container 205. After the method step s401 the method ends.

Figure 4B:
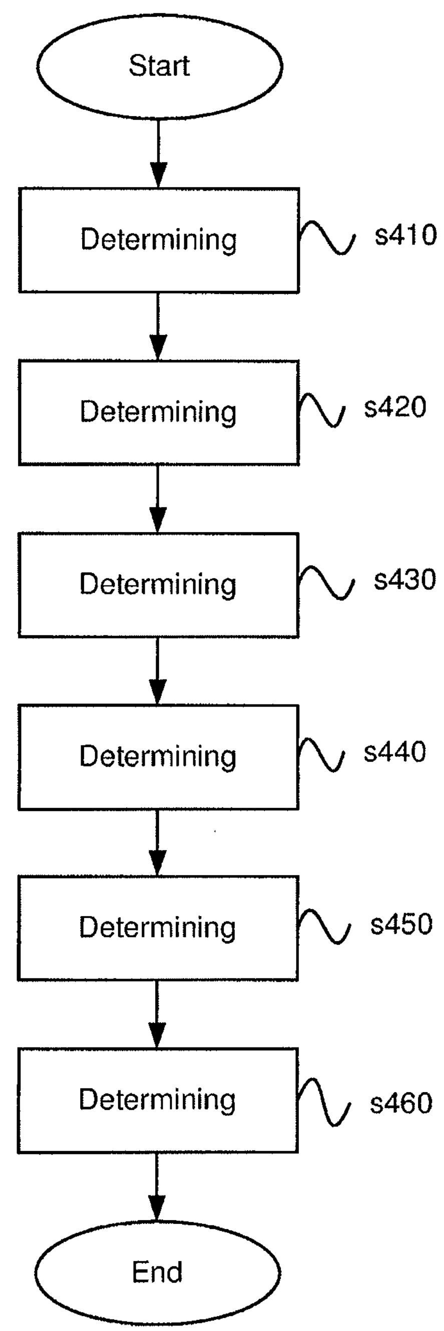
FIG. 4B is a more detailed schematic flowchart of a method according to an embodiment of the invention.

FIG. 4B schematically illustrates a flow chart of a method for evaluating an effective component content of a reducing agent for engine exhaust gas processing arranged in a container in which a heat transfer provision arrangement is provided. The method comprises the method step s410.

The method step s410 comprises the step of determining a prevailing volume of said reducing agent in said container.

After the method step s410 a subsequent method step s420 is performed.

The method step s420 comprises the step of determining a prevailing temperature of said reducing agent. This may be performed by means of said first temperature sensor 241. After the method step s420 a subsequent method step s430 is performed.

The method step s430 comprises the step of determining a prevailing temperature T2 of said heat transfer provision arrangement 240. This may be performed by measuring a prevailing temperature Tf of said fluid in said heat transfer provision arrangement 240. This may be performed by means of said second temperature sensor 242. Said prevailing temperature T2 of said heat transfer provision arrangement 240 may be determined on the basis of said temperature Tf of said fluid in said heat transfer provision arrangement 240. According to an embodiment said prevailing temperature T2 of said heat transfer provision arrangement 240 is set substantially equal to said prevailing temperature Tf of said fluid. According to one example, said prevailing temperature T2 of said heat transfer provision arrangement 240 is set equal to a temperature value being equal to said prevailing temperature Tf adjusted by means of an off-set value. Said off-set value may be a predetermined off-set value.

Alternatively, said off-set value may be dynamically determined in any suitable way. After the method step s430, a subsequent method step s440 is performed.

The method step s440 comprises the step of determining a prevailing temperature T3 of a medium surrounding said container 205. This may be performed by means of said third temperature sensor 243. After the method step s440, a subsequent method step s450 is performed.

The method step s450 comprises the step for a predetermined time period, of determining a mean temperature change rate Tprim for said reducing agent. This may be performed by means of said first control unit 200.

The method step s450 may comprise the step of determining a specified development of a connection between said effective component content C and said mean temperature change rate Tprim as a basis for said determination of said effective component content C for said prevailing volume V of said reducing agent, said prevailing temperature T1 of said reducing agent, said prevailing temperature T2 of said heat transfer provision arrangement 240 and said prevailing temperature T3 of said medium surrounding said container 205.

After the method step s450, a subsequent method step s460 is performed.

The method step s460 comprises the step of determining said effective component content C of said reducing agent on the basis of said mean temperature change rate Tprim, said prevailing volume V of said reducing agent, said prevailing temperature T1 of said reducing agent, said prevailing temperature T2 of said heat transfer provision arrangement 240 and said prevailing temperature T3 of said medium surrounding said container 205. This may be performed by means of said first control unit 200. After the method step s460 the method ends.

Figure 5:
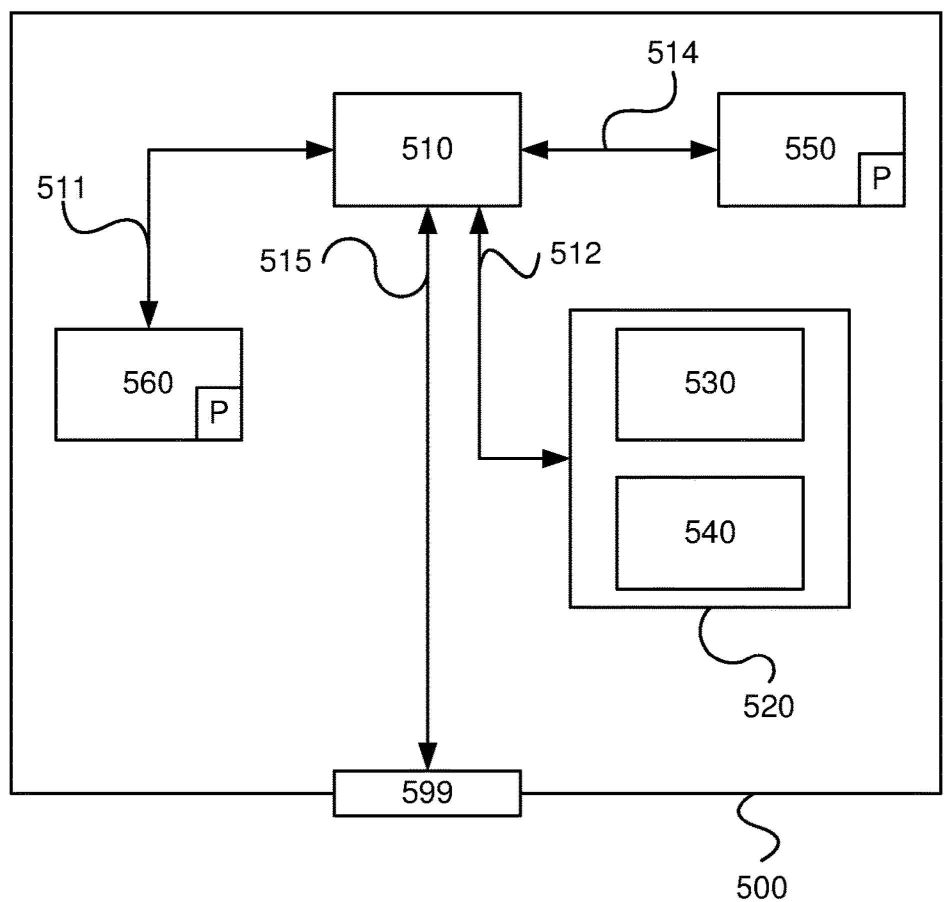
FIG. 5 schematically illustrates a computer according to an embodiment of the invention.

FIG. 5 is a diagram of one version of a device 500. The control units 200 and 210 described with reference to FIG. 2B may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program comprises routines for evaluating an effective component content C of a reducing agent for engine exhaust gas processing arranged in a container 205 in which a heat transfer provision arrangement 240 is provided.

The computer program P comprises routines for determining a prevailing volume of said reducing agent in said container. The computer program P comprises routines for determining a prevailing temperature T1 of said reducing agent. The computer program P comprises routines for determining a prevailing temperature T2 of said heat transfer provision arrangement 240. The computer program P comprises routines for determining a prevailing temperature T3 of a medium surrounding said container 205. The computer program P comprises routines, for a predetermined time period, for determining a mean temperature change rate Tprim for said reducing agent. The computer program P comprises routines for determining said effective component content C of said reducing agent on the basis of said mean temperature change rate Tprim, said prevailing volume V of said reducing agent, said prevailing temperature T1 of said reducing agent, said prevailing temperature T2 of said heat transfer provision arrangement 240 and said prevailing temperature T3 of said medium surrounding said container 205.

The computer program P may comprise routines for determining a specified development of a connection between said effective component content and said mean temperature change rate as a basis for said determination of said effective component content for said prevailing volume of said reducing agent, said prevailing temperature of said reducing agent, said prevailing temperature of said heat transfer provision arrangement and said prevailing temperature of said medium surrounding said container.

The computer program P may comprise routines for performing the innovative method wherein said mean temperature change rate Tprim for said reducing agent is a continuous temperature increase or a continuous temperature decrease.

The computer program P may comprise routines for controlling a flow of a liquid of a substantially constant temperature in a pipe arrangement of said heat transfer provision arrangement 240 during said predetermined time period.

The computer program P may comprise routines for determining said effective component content C of said reducing agent on the basis of said mean temperature change rate Tprim on least two occasions providing mutually different prevailing temperatures of said reducing agent and comparing the thus determined effective component content relating to the at least two occasions as a sign of an undesired effective component content in said reducing agent.

The computer program P may comprise routines for determining said effective component content C of said reducing agent on the basis of said mean temperature change rate Tprim on least two occasions providing mutually different prevailing temperatures of said reducing agent and comparing the thus determined effective component content relate to the at least two occasions as a sign of an undesired liquid in said reducing agent.

The computer program P may comprise routines, provided that said determined effective component content C of said reducing agent is unexpected for, providing this information for limiting a maximum available engine power of said engine 231 and/or for an alarm activity.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L231, L241, L242, L243, L250, L290 and L292, for example, may be connected to the data port 599 (see FIGS. 2A-2C).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The invention claimed is:

1. A method for evaluating an effective component content of a reducing agent for engine exhaust gas processing, wherein said reducing agent is arranged in a container in which a heat transfer provision arrangement is provided, the method comprising:

receiving, by a data processor unit, a prevailing volume of said reducing agent in said container measured by a volume measuring device;

receiving, by a data processor unit, a prevailing temperature of said reducing agent measured by a first temperature sensor;

receiving, by a data processor unit, a prevailing temperature of said heat transfer provision arrangement measured by a second temperature sensor; and receiving, by a data processor unit, a prevailing temperature of a medium surrounding said container measured by a third temperature sensor;

determining, by the data processor unit, a mean temperature change rate for said reducing agent;

determining, by the data processor unit, whether said reducing agent comprises the effective component content on a basis of said mean temperature change rate, said prevailing volume of said reducing agent, said prevailing temperature of said reducing agent, said prevailing temperature of said heat transfer provision arrangement, and said prevailing temperature of said medium surrounding said container; and providing, by the data processor unit, an output signal indicating an unexpected effective component content according to the determining of the effective component content of the reducing agent.

2. The method according to claim 1, further comprising:

determining a specified development of a connection between said effective component content and said mean temperature change rate as a basis for said determination of said effective component content for said prevailing volume of said reducing agent, said prevailing temperature of said reducing agent, said prevailing temperature of said heat transfer provision arrangement and said prevailing temperature of said medium surrounding said container.

3. The method according to claim 1, wherein said mean temperature change rate for said reducing agent is not a continuous temperature increase or not a continuous temperature decrease.

4. The method according to claim 1, wherein said heat transfer provision arrangement includes a pipe arrangement; the method further comprising:

providing a flow of a liquid of a substantially constant temperature in said pipe arrangement of said heat transfer provision arrangement during said predetermined time period.

5. The method according to claim 1, wherein said determining of said effective component content of said reducing agent on said basis of said mean temperature change rate is performed on at least two occasions for providing mutually different prevailing temperatures of said reducing agent;

the method comprising:

comparing the thus determined effective component content related to said at least two occasions for determining the unexpected effective component content in said reducing agent.

6. The method according to claim 1, comprising:

wherein said determining whether said reducing agent comprises said effective component content on said basis of said mean temperature change rate is performed on at least two occasions for possibly providing mutually different prevailing temperatures of said reducing agent;

the method comprising:

comparing the thus determined effective component content related to said at least two occasions for determining a sign of an undesired liquid in said reducing agent.

7. The method according to claim 1, comprising:

providing the output signal at least for one of limiting a maximum available engine power and an alarm activity.

8. A system for evaluating an effective component content (C) of a reducing agent for engine exhaust gas processing, wherein said reducing agent is arranged in a container in which a heat transfer provision arrangement is provided, the system comprising:

a volume measuring device configured to determine a prevailing volume (V) of said reducing agent in said container;

a first temperature sensor configured to determine a prevailing temperature of said reducing agent;

a second temperature sensor configured to determine a prevailing temperature of said heat transfer provision arrangement; and a third temperature sensor configured to determine a prevailing temperature of a medium surrounding said container;

a data processor unit configured to determine a mean temperature change rate for said reducing agent regarding a predetermined time period;

the data processor unit configured to determine whether said reducing agent comprises said effective component content on a basis of said mean temperature change rate, said prevailing volume of said reducing agent, said prevailing temperature of said reducing agent, said prevailing temperature of said heat transfer provision arrangement and said prevailing temperature of said medium surrounding said container; and the data processor unit configured to provide an output signal indicating an unexpected effective component content according to the determining of the effective component content of the reducing agent.

9. The system according to claim 8, wherein the data processor unit is configured to determine a specified development of a connection between said effective component content and said mean temperature change rate as a basis for said determination of said effective component content for said prevailing volume of said reducing agent, said prevailing temperature, of said reducing agent, said prevailing temperature of said heat transfer provision arrangement and said prevailing temperature of said medium surrounding said container.

10. The system according to claim 8, wherein said mean temperature change rate for said reducing agent is not a continuous temperature increase or not a continuous temperature decrease.

11. The system according to claim 8, further comprising:

a pipe arrangement of said heat transfer provision arrangement; and a pump configured to provide a flow of a liquid of a substantially constant temperature in said pipe arrangement of said heat transfer provision arrangement during said predetermined time period.

12. The system according to claim 8, wherein the data processor unit is configured to determine said effective component content of said reducing agent on said basis of said mean temperature change rate on least two occasions, and to provide mutually different prevailing temperatures of said reducing agent; and the data processor unit is configured to compare the thus determined effective component content related to said at least two occasions as a sign of an unexpected effective component content in said reducing agent.

13. The system according to claim 8, whether the data processor unit is configured to determine said effective component content of said reducing agent on said basis of said mean temperature change rate on least two occasions, and to provide mutually different prevailing temperatures of said reducing agent; and the data processor unit is configured to compare the thus determined effective component content related to said at least two occasions as a sign of an unexpected liquid in said reducing agent.

14. The system according to claim 8, wherein the data processor unit is configured to provide the output signal for at least limiting one of a maximum available engine power and an alarm activity.

15. A vehicle comprising a system according to claim 8.

16. The vehicle according to claim 15, wherein the vehicle comprises one of a truck, a bus, or a passenger car.

17. A computer program product comprising a non-transitory computer program recording medium incorporating a computer program comprising program code, such that when said program code is executed in an electronic control unit, said program code causes said electronic control unit to perform the steps according to claim 1.

* * * * *